United States Patent [19]
Brule et al.

[11] Patent Number: 5,241,023
[45] Date of Patent: Aug. 31, 1993

[54] PROCESS AND DEVICE FOR THE GAS PHASE POLYMERIZATION OF ALPHA-OLEFINS

[75] Inventors: Daniel Brule, Lavera; Jean-Marie Iffly, Istres; Charles Raufast, Saint Julien Le, all of France

[73] Assignee: BP Chemicals Limited, London, England

[21] Appl. No.: 664,110

[22] Filed: Mar. 4, 1991

[30] Foreign Application Priority Data

Mar. 9, 1990 [FR] France ................................ 90 03299

[51] Int. Cl.$^5$ ............................................ C08F 2/34
[52] U.S. Cl. ........................................ 526/70; 526/75; 526/901
[58] Field of Search ............................ 526/75, 70, 901

[56] References Cited
FOREIGN PATENT DOCUMENTS

| | | |
|---|---|---|
| 0059080 | 9/1982 | European Pat. Off. . |
| 2006232 | 5/1979 | United Kingdom . |
| 2024832 | 1/1980 | United Kingdom . |
| 8802376 | 4/1988 | World Int. Prop. O. . |

*Primary Examiner*—Joseph L. Schofer
*Assistant Examiner*—Tom Weber
*Attorney, Agent, or Firm*—Brooks, Haidt, Haffner & Delahunty

[57] ABSTRACT

The present invention relates to a process and a device for polymerizing alpha-olefins such as ethylene or propylene in a gas phase. The device comprises a gas phase polymerization reactor (5) into which a suspension of prepolymer particles in liquid saturated hydrocarbon(s) is continuously introduced. The prepolymer suspension is prepared in one or more prepolymerization vessels (14) and is continuously passed to a post-treatment unit comprising a degassing means (10) wherein most of the dissolved unreacted olefinic monomer(s) is separated. Preferably, the post-treatment unit may comprise a particle separation means (11) for removing the finest and/or coarsest prepolymer particles from the suspension and/or a concentration means (11a) for concentrating the suspension.

High activity catalyst can be used in the process with reduced amounts of prepolymer agglomerates. Prepolymer can be obtained with a constant quality and a desired size.

18 Claims, 2 Drawing Sheets

PROCESS AND DEVICE FOR THE GAS PHASE POLYMERIZATION OF ALPHA-OLEFINS

The present invention relates to a process and an apparatus for a gas phase catalytic polymerization of alpha-olefins.

Processes are known for the gas phase polymerization or copolymerization of alpha-olefins, especially ethylene or propylene, in the presence of a catalyst system.

The so-called Ziegler-Natta catalyst systems are known in particular, said systems containing on the one hand a solid catalyst which is a compound of a transition metal belonging to group IV, V or VI of the Periodic Table of the Elements, for example a titanium, vanadium or zirconium chloride, and on the other hand a cocatalyst selected amongst organometallic compounds of a metal of group I, II or III of the Periodic Table, for example alkylaluminium compounds.

Recent processes for the catalytic polymerization of alpha-olefins can use high-activity catalysts, e.g. Ziegler-Natta type catalysts containing compounds of magnesium and transition metals or thermally activated chromium oxide catalysts optionally used with a catalyst activator selected amongst organometallic compounds of a metal of group I, II or III of the Periodic Table of elements.

The gas phase catalytic polymerization of alpha-olefins is generally carried out in a mechanically-stirred bed reactor, or in a fluidized bed reactor, in which the solid polymer particles being formed are kept in the fluidized state in an ascending gaseous stream containing the gaseous olefinic monomer(s) to be polymerized. The gaseous mixture emerging at the top of the reactor contains unpolymerized olefinic monomer(s). It is generally cooled before being recycled into the reactor, after it has been mixed with a further amount of fresh olefinic monomer(s). The catalyst system is introduced into the reactor continuously or intermittently.

The constituents of the catalyst system, i.e. the solid catalyst and optionally the cocatalyst or the catalyst activator can be mixed before being introduced into the reactor, or they can be introduced separately and mixed inside the reactor.

The polymerization reaction is exothermic and a gas phase polymerization reactor is difficult to run. The polymerization reaction can start very suddenly as soon as the catalyst is in contact with the olefin, which is likely to create localized runaway reactions; these in turn can give rise to hot spots, which are likely to result in the formation of solid agglomerates or flakes of polymer and considerably to perturb the operation of the reactor.

These risks are even greater when high-activity catalysts are used.

It is also necessary to prevent the catalyst introduced into the reactor, and the polymer formed, from containing excessively fine particles which can be entrained by the gaseous stream and clog the recycle gas pipes. Furthermore, the coarsest particles can deposit in the bottom of the gas phase reactor and block the incoming gaseous stream.

A known solution for reducing the formation of hot spots and the amount of fine particles consists in prepolymerizing a small amount of alpha-olefins with the catalyst in a zone outside the gas phase polymerization reactor, and introducing prepolymer particles containing the catalyst into said reactor.

French Patent Application FR-A-2322890 describes a process for the production of an olefin polymer by effecting polymerization in two stages. In a first stage, a prepolymerization is effected in a liquid medium consisting of liquid olefinic monomer(s), which is/are prepolymerized in the presence of a TiCl$_3$-based catalyst to form a suspension of prepolymer particles in the said liquid olefinic monomer(s). The liquid olefinic monomer(s) is/are partially separated from prepolymer particles to give a concentrated suspension of prepolymer particles in the said liquid olefinic monomer(s). In a second stage, a polymerization is effected in the substantial absence of a liquid phase by contacting gaseous olefinic monomer(s) with the concentrated suspension of prepolymer particles. The catalytically active prepolymer remains in contact with the olefinic monomer(s) until it enters the gas phase polymerization reactor, so that the prepolymerization continues. If this process were used with a high-activity catalyst, it would be very difficult to control the particle size of the prepolymer arriving in the gas phase reactor and to avoid agglomeration of prepolymer particles in the concentrated suspensions.

French Patent Application FR-A-2529211 describes a process for a gas phase polymerization of olefins in a fluidized bed reactor using a Ziegler-Natta type catalyst previously transformed into a prepolymer during a prepolymerization which is carried out either in suspension in a liquid phase or in gas phase. In any case, after the prepolymerization, the prepolymer is recovered in the form of a dry powder and is introduced as such into the fluidized bed reactor.

French Patent Application FR-A-1513938 describes a process for the polymerization of ethylene in the presence of a catalyst system of the Ziegler-Natta type. The process involves a step for the prepolymerization of ethylene in suspension in an inert liquid hydrocarbon. When the main polymerization is carried out in a gas phase reactor, the prepolymer is separated from the inert liquid hydrocarbon and is introduced as a dry powder into the gas phase reactor.

The aims of the present invention are to provide a process and an apparatus for the production and treatment of particles of alpha-olefin prepolymer, especially ethylene or propylene prepolymer, which make it possible continuously to inject into a gas phase polymerization reactor prepolymer particles which can contain a high-activity catalyst. The prepolymer has a highly reproducible catalytic activity and especially a good particle size distribution, making it possible to reduce the formation of prepolymer agglomerates prior to the introduction of the prepolymer in a gas phase polymerization reactor, and to reduce the formation of polymer agglomerates in the gas phase polymerization reactor.

There has now been found a process for polymerization of one or more olefinic monomers in a gas phase polymerization reactor in the presence of a solid catalyst comprising a transition metal belonging to Group IV, V or VI of the Periodic Table of the elements, said process being one in which the solid catalyst is introduced into the reactor in the form of a prepolymer suspension prepared in a prepolymerization zone by bringing at least one of the olefinic monomers into contact with the said solid catalyst in the presence of one or more liquid saturated hydrocarbons to form a suspension of prepolymer particles in the said liquid saturated hydrocarbon(s) containing olefinic monomer(s) under a pressure P, characterised in that a suspension of prepolymer particles in the liquid saturated hydrocarbon(s) flows continuously from the prepolymerization zone via a post-treatment zone to the gas phase polymerization reactor, the suspension being subjected in the post-treatment zone to an operation comprising degassing for removing unreacted olefinic monomer(s) from the said suspension.

The solid catalyst is used to prepolymerize continuously olefinic monomer(s) in the prepolymerization zone wherein one or more olefinic monomers containing 2 to 6 carbon atoms, especially ethylene or propylene, and the solid catalyst, optionally with a cocatalyst or a catalyst activator are brought together in one or more inert liquid saturated hydrocarbons selected amongst alkanes usually containing 4 to 10 carbon atoms and cycloalkanes containing 5 to 8 carbon atoms, so as to give a suspension of prepolymer particles in said liquid saturated hydrocarbon(s) which contains olefinic monomer(s) in solution. The preferred liquid saturated hydrocarbons are alkanes containing 4 to 8, e.g. 4 to 6 carbon atoms, especially n-butane, iso-butane, n-pentane, isopentane or n-hexane or a mixture of these alkanes.

Advantageously, the unreacted olefinic monomer(s) removed in the degassing operation may be recycled into the prepolymerization zone and or the gas phase polymerization reactor.

According to a preferred embodiment, the suspension of prepolymer particles in the liquid saturated hydrocarbon(s) may be subjected in the post-treatment zone to a concentration operation comprising concentrating the said suspension by removing part of the said liquid saturated hydrocarbon(s) from said suspension of prepolymer particles. The degassing and concentration operations may be performed simultaneously or, preferably, successively in the direction of the continuous flow of the suspension of prepolymer particles from the prepolymerization zone via the post-treatment zone to the gas phase polymerization reactor.

Advantageously, the liquid saturated hydrocarbon(s) separated from prepolymer particle suspension in the concentration operation may be recycled into the prepolymerization zone.

According to another preferred embodiment, the suspension of prepolymer particles in the liquid saturated hydrocarbon(s) may be subjected to a particle separation operation comprising separating the finest and/or coarsest prepolymer particles from said suspension in the prepolymerization zone and or the post-treatment zone. The degassing and particle separation operations may be performed simultaneously or, preferably, successively in the direction of the continuous flow of the prepolymer suspension. During the formation of the suspension of prepolymer particles in the prepolymerization zone, the said suspension may be subjected to a particle separation operation comprising separating the coarsest prepolymer particles from the suspension.

Advantageously, a particle separation operation comprising separating the finest prepolymer particles from the prepolymer suspension may be carried out in the post-treatment zone. Preferably, the finest prepolymer particles separated from the prepolymer suspension are recycled into the prepolymerization zone.

According to another preferred embodiment, the particle separation and concentration operations may be performed simultaneously or, preferably, successively in the direction of the continuous flow of the prepolymer suspension.

According to another preferred embodiment, the suspension of prepolymer particles flowing from the prepolymerization zone may be subjected in the post-treatment zone to the degassing operation followed simultaneously or, preferably, successively in the direction of the continuous flow by the particle separation operation and the concentration operation.

The suspension of prepolymer particles emerging from the prepolymerization zone may be first passed continuously into a degassing vessel, where the bulk or most of the olefinic monomer(s) dissolved in the liquid phase is removed. The prepolymer suspension thus degassed emerging from said degassing vessel is then preferably passed continuously into a particle separation and concentration apparatus, which removes the finest particles and part of the liquid phase of the prepolymer suspension to product a concentrated prepolymer suspension which contains a reduced proportion and usually only a small proportion of fine particles and which is continuously introduced into the gas phase polymerization reactor.

The degassing, particle separation and concentration operations are carried out continuously from the prepolymerization zone up to the introduction of the prepolymer suspension into the gas phase polymerization reactor. They can be carried out simultaneously or successively in any order.

However, according to a preferred embodiment, the degassing is carried out first, followed by the particle separation and concentration, which can be simultaneous or stepwise in either order.

buffer tanks can be inserted between the apparatuses in which the prepolymerization, degassing, particle separation and concentration operations can take place, but still with continuous flow of prepolymer suspension through the zones.

Advantageously, the prepolymerization is carried out continuously, in at least 2, such as 2 to 4 successive stages, under temperature, pressure and concentration conditions such that the prepolymerization rate increases from the first to the last stage, and such that the ratio of the prepolymerization rate during the last stage to that during the first stage is from 2 to 20 and preferably from 5 to 10.

Advantageously, the temperature $T_1$ during the first prepolymerization stage is from $-10°$ C. to $70°$ C., preferably from $20°$ C. to $50°$ C., and the temperature $T_2$ during the last prepolymerization stage is below $110°$ C. and preferably below $90°$ C. so as to reduce the amount of prepolymer soluble in the liquid alkane(s).

Advantageously, the maximum temperature $T_2$ during the last stage is from $60°$ C. to $90°$ C., preferably from $70°$ C. to $80°$ C.

The temperature $T_2$ is usually greater than the temperature $T_1$, e.g. from $5°$ C. to $80°$ C., and preferably from $20°$ C. to $60°$ C. larger.

According to a preferred embodiment, the temperature of the prepolymer suspension may not decrease when the prepolymer suspension flows from the prepolymerization zone to the post-treatment zone, particularly in the post-treatment zone preferably during the degassing operation.

In particular, the prepolymer suspension may emerge from the prepolymerization zone at a relatively high temperature $T_2$, e.g. $60°$ C. to $90°$ C., and may be heated further during the degassing operation with a reduced risk of forming prepolymer agglomerates, thereby facilitating the injection of the prepolymer suspension into the gas phase polymerization reactor and improving the heat balance.

According to a first embodiment, during the prepolymerization the suspension of catalyst and, if present, prepolymer may be passed in series through several prepolymerization vessels, such as at least 2, e.g. 2 to 4 vessels each equipped with agitation means, e.g. a stirrer, and the temperature T1 in the first vessel is lower than the temperature T2 in the last vessel.

According to another embodiment, the prepolymerization may take place continuously in a tubular reactor in which the temperature, pressure and concentration conditions change from one end of the reactor to the other. For example, the suspension of catalyst and, if present, prepolymer is passed from bottom to top in a vertical tubular reactor equipped with a stirrer and divided into superposed compartments which are separated by horizontal partitions having a central orifice through which said suspension passes from bottom to top, and the conditions regarding temperature and the concentrations of catalyst, olefinic monomer(s) and optionally cocatalyst or catalyst activator, are such that the prepolymerization rate increases from the inlet to the outlet of the tubular reactor.

The present invention also relates to an apparatus for the gas phase polymerization of olefin(s) comprising a prepolymerization unit (6, 7, 14) for converting a solid catalyst, one or more olefinic monomer(s) and one or more liquid saturated hydrocarbon(s) under pressure into a suspension of prepolymer particles in the liquid saturated hydrocarbon(s) containing olefinic monomer(s), and a gas phase polymerization reactor (5) equipped with a suspension introduction means, characterised in that a post-treatment unit comprising a degassing means (10) for removing unreacted olefinic monomer(s) from the said suspension is provided between the prepolymerization unit (6, 7, 14) and the gas phase polymerization reactor (5), so that the suspension of prepolymer particles flows continuously from the prepolymerization unit (6, 7, 14) through the post-treatment unit to the suspension introduction means of the gas phase polymerization reactor (5).

Advantageously, the degassing means (10) is provided with a gas outlet pipe (10a) connected to the prepolymerization unit (6, 7, 14) and/or the gas phase polymerization reactor (5) for recycling the olefinic monomer(s) to the said prepolymerization unit and/or the said gas phase polymerization reactor.

According to a preferred embodiment, the post-treatment unit comprises a concentration means (11a) for concentrating a suspension of prepolymer particles by removing part of the liquid saturated hydrocarbon(s) from prepolymer particles.

Advantageously, the concentration means (11a) is provided with a liquid outlet pipe connected to the prepolymerization unit (6, 7, 14) for recycling the liquid saturated hydrocarbon(s) removed from prepolymer particle suspension to the said prepolymerization unit.

According to another preferred embodiment, the post-treatment unit comprises a particle separation means (11) for separating the finest and/or coarsest prepolymer particles from a suspension of prepolymer particles.

Advantageously, the particle separation means (11) is provided with a suspension outlet pipe (13a) connected to the prepolymerization unit (6, 7, 14) for recycling the finest prepolymer particles separated from the suspension of prepolymer particles to the said prepolymerization unit.

According to another preferred embodiment, the prepolymerization unit (6, 7, 14) comprises a coarse particle separation means (25) for separating the coarsest prepolymer particles from the suspension of prepolymer particles.

According to another preferred embodiment, a post-treatment unit comprising the degassing means (10), the concentration means (11a) and the particle separation means (11) is provided between a prepolymerization unit (6, 7, 14) for converting a solid catalyst in the presence of an organometallic compound, one or more olefinic monomers and one or more liquid saturated hydrocarbons e.g. alkanes into a suspension of prepolymer particles in the said liquid saturated hydrocarbon(s) containing olefinic monomer(s), and the suspension introduction means of the gas phase polymerization reactor (5).

Preferably, the prepolymerization unit (6, 7, 14) is connected to the degassing means (10) itself connected to the concentration means (11a), which is in turn connected to the suspension introduction means of the gas phase polymerization reactor (5), so that the suspension of prepolymer particles flows continuously from the prepolymerization unit (6, 7, 14) through successively the degassing means (10) and the concentration means (11a) to the suspension introduction means.

According to another preferred embodiment, the prepolymerization unit (6, 7, 14) is connected to the degassing means (10) itself connected to the particle separation means (11), which is in turn connected to the concentration means (11a) itself connected to the suspension introduction means of the gas phase polymerization reactor (5), so that the suspension of prepolymer particles flows continuously from the prepolymerization unit (6, 7, 14) through successively the degassing means (10), the particle separation means (11) and the concentration means (11a) to the suspension introduction means.

According to another preferred embodiment, a means for introducing a catalyst activator or a cocatalyst and/or a catalyst inhibitor into the suspension of prepolymer particles is provided in the post-treatment unit (6, 7, 14), preferably between the post-treatment unit (6, 7, 14) and the gas phase polymerization reactor (5), especially in the suspension introduction means of the gas phase polymerization reactor (5).

The following description refers to the attached drawings, which illustrate, without implying any limitation, embodiments of apparatuses in which the process according to the invention may be carried out.

Figure 1:
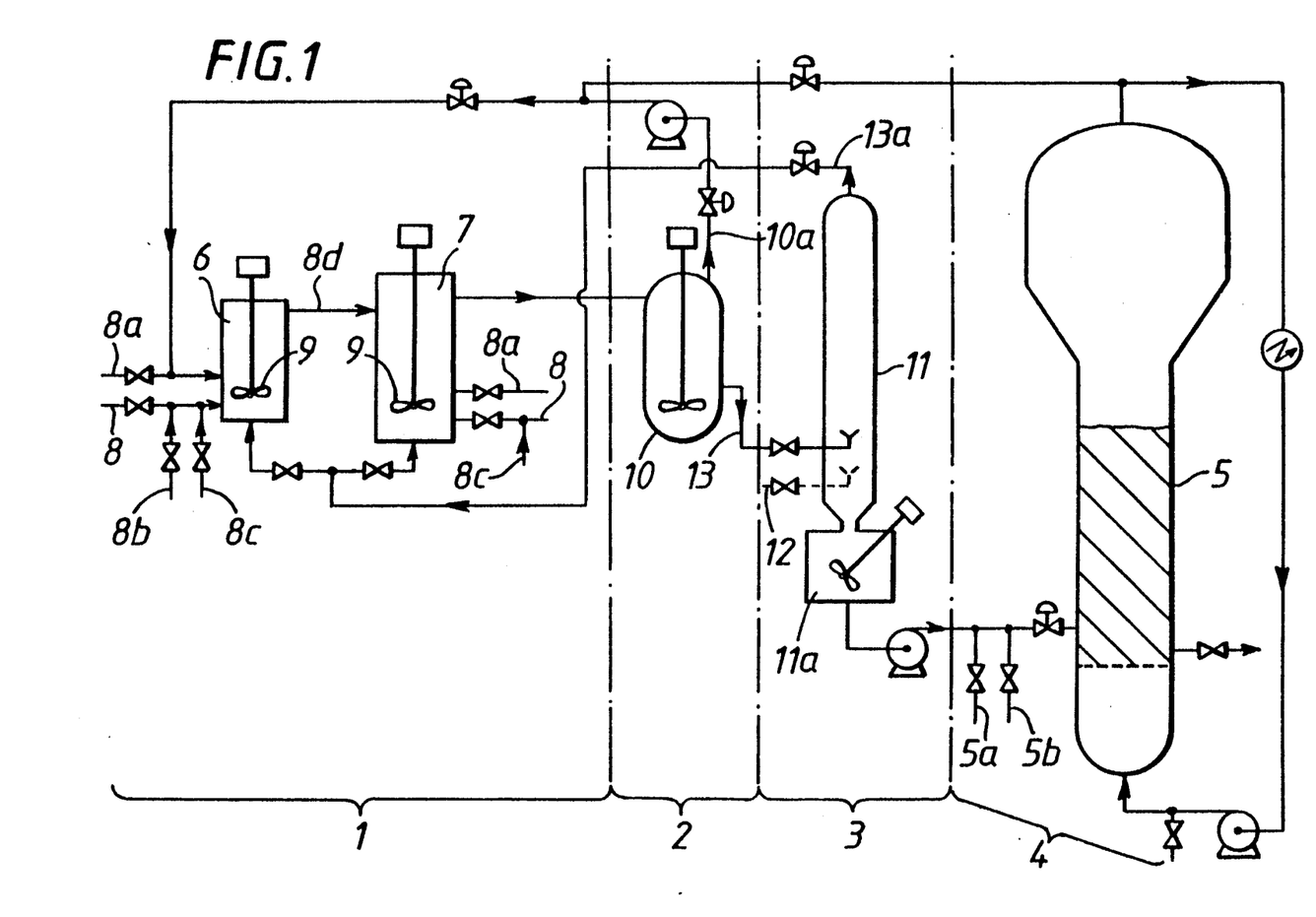
FIG. 1 schematically illustrates a first embodiment of an apparatus according to the invention.

This first embodiment unit is divided into four zones, numbered 1 to 4, through which a prepolymer suspension in the liquid alkane(s) is formed and passes successively, said prepolymer suspension flowing continuously from the inlet of zone 1 to a gas phase polymerization reactor (5), which is advantageously a fluidized bed reactor but which can also be a reactor with a mechanically agitated bed.

Zone 1 is a zone for prepolymerization of one or more olefinic monomers in suspension in the liquid alkane(s) to form a prepolymer suspension.

Zones 2 and 3 represent the post-treatment zone. In particular, zone 2 is a zone for degassing of the liquid phase of the prepolymer suspension.

Zone 3 is a zone for concentration of the prepolymer suspension and removal of the fine particles from the prepolymer suspension.

Zone 4 represents the gas phase polymerization reactor (5).

Between these zones, it is possible to make provision for one or more intermediate or buffer zones for transfer of the prepolymer suspension in order to create an intermediate and temporary reserve of this suspension, especially in the case where an incident occurs in one of the zones with temporary shutdown of the operations carried out in this zone. The existence of such an intermediate transfer zone does not alter the fact that all these operations are carried out continuously.

Figure 2:
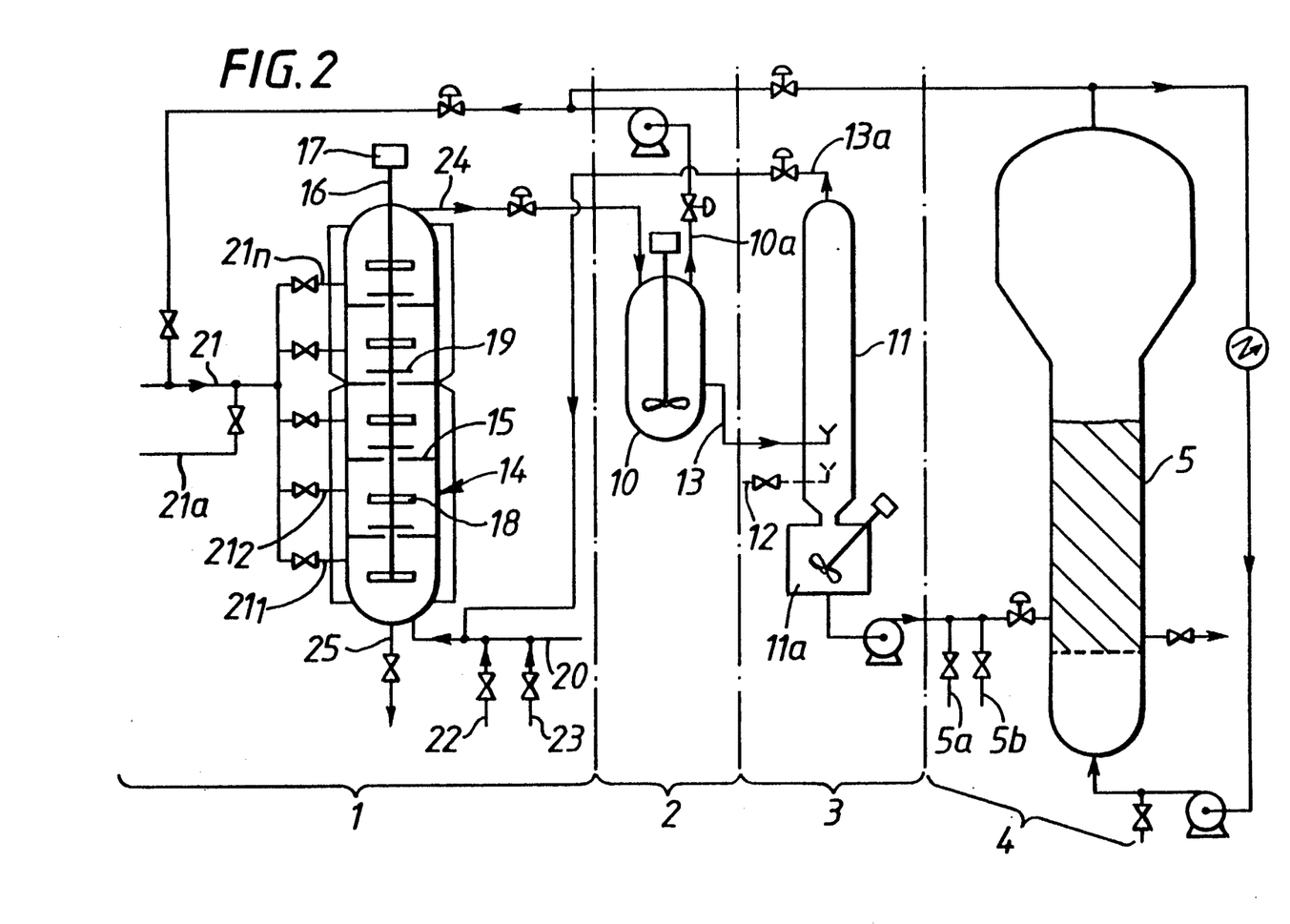
FIG. 2 schematically illustrates a second embodiment of an apparatus according to the invention.

FIGS. 1 and 2 do not illustrate the operations for preparation of the solid catalyst. These operations, which take place in separate units, are generally known. They are described in detail in French Patent Application FR-A-2529211 and FR-A-2405961, for example.

The solid catalyst is for example a high activity catalyst of the Ziegler-Natta type in the form of solid particles having a mass mean diameter from 10 to 200, e.g. 20 to 150 microns and containing atoms of magnesium, halogen, e.g. chlorine or bromine and at least one transition metal of group IV, V or VI of the Periodic Table of the Elements, e.g. titanium, vanadium or zirconium. If appropriate, the catalyst may be deposited on a support composed, for example, of silica, alumina or a magnesium compound, e.g. a magnesium chloride or a magnesium alkoxide.

Another type of high activity catalyst which can be used, is a catalyst containing a thermally activated chromium oxide supported on a refractory oxide in the form of particles having a mass mean diameter from 50 to 200, e.g. 60 to 150 microns.

A cocatalyst or a catalyst activator may be used during the prepolymerization. It is selected amongst the organometallic compounds containing a metal of group I, II or III of the Periodic Table of the Elements, in particular aluminium, zinc or magnesium.

Zone 1 can comprise several prepolymerization vessels, for example two polymerization vessels (6) and (7), which are each kept at a given temperature with the help of a jacket in which a cooling liquid is circulated at a rate which is regulated as a function of the temperature of the prepolymerization.

Into the first prepolymerization vessel (6) are introduced a continuous flow of the liquid alkane(s) through a pipe (8), and a continuous flow of one or more olefinic monomers through a pipe (8a).

A solid catalyst and optionally a cocatalyst or a catalyst activator are also introduced into the prepolymerization vessel (6) through inlets (8b) and (8c); they have already been prepared and can be totally or partially mixed before being introduced into the said vessel. The solid catalyst can be introduced in suspension in an inert liquid hydrocarbon, for example in alkane(s) identical to or different from the alkane(s) used in the prepolymerization. The cocatalyst or the catalyst activator can be introduced in solution in an inert liquid hydrocarbon, e.g. liquid saturated hydrocarbon(s) identical to or different from the liquid saturated hydrocarbon(s) used in the prepolymerization. A first prepolymerization stage is carried out in the vessel (6).

Each vessel (6) and (7) is equipped with a means of mixing the liquid phase of the suspension of catalyst or, if present, prepolymer, for example a mechanical stirrer (9). The vessels (6) and (7) have identical or different sizes. Preferably, the vessel (7) has a volume 1.5 to 10, preferably 2 to 6 times larger than the volume of the vessel (6). A second prepolymerization stage is carried out in the vessel (7).

The vessel (6) is connected to the vessel (7) by a pipe (8d), which enables the prepolymer suspension to pass continuously from the first prepolymerization stage to the second prepolymerization stage.

The vessel (7) can be equipped with one or more of the pipes (8), (8a) and (8c) for feeding the vessel (6) with the various ingredients for the prepolymerization, the pipe (8b) for supplying solid catalyst being preferably omitted.

Preferably, hydrogen can be introduced into the vessels (6) and/or (7) for the purpose of limiting the length of the prepolymer chains.

The olefinic monomer(s) polymerize(s) in contact with the catalyst particles and produce(s) solid particles of prepolymer containing the catalyst in an active form. The prepolymer particles are in suspension in the inert liquid alkane(s) passing continuously through the vessel (6) and the vessel (7).

As soon as the olefinic monomer(s) is/are brought into contact with the solid catalyst, the prepolymerization reaction begins and, as this reaction is exothermic and may be very fast in the initial stage, it may cause the particles of catalyst and prepolymer to burst. This bursting gives rise to fine particles which would be likely to perturb the operation of the gas phase polymerization reactor.

To avoid this drawback, the prepolymerization conditions may be chosen such that the prepolymerization rate is relatively low at the start of the prepolymerization and then may preferably increase after the initial stage.

FIG. 1 illustrates an embodiment in which the prepolymerization takes place in two separate vessels (6) and (7) whose temperatures T1 and T2 respectively are preferably as given above. The pressure in the two vessels (6) and (7) can be from $10^4$ to $3\times10^6$, preferably $10^5$ to $10^6$, especially from $2\times10^5$ to $5\times10^5$ Pa.

These conditions can make it possible to obtain a ratio of the prepolymerization rate in the vessel (7) to that in the vessel (6) of 2 to 20, preferably 5 to 10.

Other equivalent means can be used to obtain different prepolymerization rates in the vessels (6) and (7). For instance, another means consists in introducing one part of the olefinic monomer(s) into the vessel (6) and another part into the vessel (7) so that the concentration of the olefinic monomer(s) in the alkane(s) and hence the prepolymerization rate are higher in the second vessel (7) than in the first vessel (6).

It is also possible to divide the introduction of the cocatalyst or the catalyst activator, if present, and introduce one part thereof into the vessel (6) and another part into the vessel (7).

The suspension of prepolymer particles emerging from the vessel (7) generally contains olefinic monomer(s) dissolved in the liquid alkane(s) which would continue to prepolymerize in contact with the catalyst and/or the prepolymer. If no steps were taken for stopping the prepolymerization, it would be difficult to control the particle size of the prepolymer, which is a very important factor for the satisfactory running of a gas phase polymerization reactor. Moreover, the relatively large amounts of unreacted olefinic monomer(s) dissolved in the liquid alkane(s) favour the formation of prepolymer agglomerates in zones not intended for a prepolymerization reaction, i.e. in zones situated between the prepolymerization zone and the gas phase polymerization reactor, in particular in the post-treatment zone.

The prepolymer suspension emerging from the vessel (7) is introduced continuously into a degassing vessel (10). The pressure P of the prepolymer suspension entering the vessel (10) is suddenly relaxed so that the solubility of the olefinic monomer(s) in the suspension decreases and a large part of the olefinic monomer(s) escapes from the suspension and emerges from the vessel (10) in the gaseous state through a pipe (10a). Particularly, when the prepolymer suspension flowing from the prepolymerization zone under a pressure P and penetrates into the degassing vessel (10), the pressure of the prepolymer suspension is reduced by 5 to 80%, preferably 10 to 60%, especially 15 to 50% of the pressure P.

This gaseous olefinic monomer(s) can be recycled, for example by being mixed with the olefinic monomer(s) which is/are introduced into the gas phase polymerization reactor (5) and/or into the prepolymerization zone, such as in the vessels (6) and (7), or may be passed directly into reactor (5) or vessel (6) and/or (7).

The degassing vessel (10) can be equipped with a means of agitation, e.g. stirring a suspension. It is preferably a flash degassing vessel.

The temperature of the prepolymer suspension in the degassing vessel (10) can be kept at a value at least equal to or preferably higher than the temperature T2 in the vessel (7) so as to reduce the solubility of the olefinic monomer(s) in the suspension. In particular, the temperature of the prepolymer suspension in the degassing vessel (10) is lower than 110° C., preferably lower than 90° C., especially from 60° to 100° C., e.g. 70° to 90° C.

The prepolymer suspension emerging continuously from the degassing vessel (10) may contain prepolymer particles in a concentration of about 100 g/l to 500 g/l. The prepolymer particles can have a mass-average diameter, Dm, of 100 to 400 microns and can contain some fine particles with a diameter of less than 50 microns.

Before introducing the prepolymer suspension into the gas phase polymerization reactor (5), it may be advantageous to remove the majority of fine particles from this suspension and also to remove part of the liquid alkane(s) to give a more concentrated prepolymer suspension which can contain about 300 g/l to 700 g/l of prepolymer.

The prepolymer suspension emerging from the degassing vessel (10) preferably may be continuously introduced through a pipe (13) into a particle separation apparatus (11) and then into a concentration apparatus (11a) situated in zone 3 of the unit.

According to a first embodiment, the apparatus (11) is a vertical sedimentation or elutriation column. The prepolymer suspension coming from the degassing vessel (10) is introduced continuously into the column.

Liquid alkane(s) is/are taken off at the top of the column, through a pipe (13a), at a rate which is determined so that the ascending velocity of the liquid in the column is greater than the sedimentation velocity of the prepolymer particles with a given diameter, for example a diameter of 50 microns. Thus the majority of the fine particles with a diameter of less than 50 microns are entrained towards the top and are removed at the same time as part of the liquid alkane(s). The removed liquid alkane(s) containing the fine prepolymer particles can advantageously be recycled into the prepolymerization vessel or vessels (6) and (7).

The prepolymer particles not entrained towards the top of the column fall to the bottom of the column (11), which is connected directly or indirectly to the concentration apparatus (11a), into which a relatively concentrated suspension of prepolymer particles in the liquid alkane(s) is obtained substantially free of fine particles and prepolymer agglomerates. The concentration apparatus (11a) may be preferably provided with an agitation, e.g. a stirrer. The concentrated prepolymer suspension leaves the apparatus (11a) and is continuously introduced into the gas phase polymerization reactor (5).

As a variant, the column (11) can advantageously have an additional inlet (12) for fresh liquid alkane(s), situated in the lower part of the column, underneath the inlet (13) for the prepolymer suspension. In this case, the velocity of the ascending stream of liquid underneath the inlet (12) determines the maximum size of the fine particles which are entrained towards the top, and the column (11) operates as an elutriator. The fresh liquid alkane(s) may be preferably identical to the alkane(s) used in the prepolymerization zone.

According to another variant, zone 3 can comprise a hydrocyclone in which the prepolymer suspension emerging from the degassing vessel enters tangentially and which performs the same operations as a decantation or elutriation column, namely removal of the fine prepolymer particles and concentration of the prepolymer suspension. In that case, the particle separation and concentration operations are carried out simultaneously and the hydrocyclone comprises the particle separation means and the concentration means in one apparatus.

Other equivalent means can be used in zone 3 for reducing the proportion of fine particles in the prepolymer suspension. For example, it is possible to use continuous screening or filtration processes or particle size separation processes in inert liquid alkane(s).

A first beneficial effect of the present invention is the fact that the preparation of the prepolymer is totally continuous and thus gives a prepolymer suspension which has homogeneous and constant properties with time and contains prepolymer particles of a desired size and high activity with reduced amounts of prepolymer agglomerates.

Another result is that of reducing the adverse effects due to local increases in the temperature of the prepolymer particles at the moment when the prepolymer is injected into the gas phase polymerization reactor. It is now possible to obtain a high productivity by means of prepolymerized catalysts having a high level of initial activity.

Compared with the results obtained when dry prepolymer particles are injected into the gas phase reactor, a substantial increase in the productivity of a reactor is obtained.

Another beneficial effect of the continuous introduction of a prepolymer suspension in the liquid alkane(s) into the gas phase polymerization reactor is the fact that a catalyst activator or a cocatalyst can be added directly in variable amounts through a pipe (5a) to the prepolymer suspension flowing through the post-treatment zone, or preferably flowing from the post-treatment zone to the gas phase polymerization reactor, in order to control the polymerization rate in the gas phase polymerization reactor. This addition can be done without fear of a sudden revival of the prepolymerization and with a reduced risk of forming agglomerates or blocking of the pipe for injecting the prepolymer suspension into the gas phase polymerization reactor. A catalyst inhibitor for reducing the activity of the prepolymer can also be added directly in variable amounts to the prepolymer suspension through a pipe (5b).

By varying the amounts of catalyst activator or cocatalyst and/or catalyst inhibitor, it is possible instantaneously to adjust the activity of the prepolymer and to control the polymerization reaction in the gas phase polymerization reactor.

As catalyst activator or cocatalyst, it is possible to use an organometallic compound containing a metal of group I, II or III of the Periodic Table, such as an alkylaluminium, an alkylzinc or an alkylmagnesium, e.g. triethylaluminium, triisobutylaluminium, tri-n-hexylaluminium, tri-n-octylaluminium, diethylaluminium monochloride, methylaluminoxane or diethylzinc.

The catalyst activator or cocatalyst optionally used in the prepolymerization zone, can be injected partly into the vessels (6) and/or (7) and partly after the post-treatment zone and before the gas phase polymerization reactor (5), preferably in the suspension introduction means of the gas phase polymerization reactor.

As catalyst inhibitor, it is possible to use a compound containing one or more compounds known as catalysts poisons, for example water, alcohol, oxygen, carbon oxide, carbon dioxide, oxygenated compounds and, in general, any organic electron-donor compounds, e.g. ethers, amines, amides, phosphines, phosphoramides, sulfoxides, carboxylic aromatic acid esters and silanes.

FIG. 2 illustrates the essential parts of another embodiment of a unit for the catalytic production of olefin polymers or copolymers in which a process according to the invention may be carried out.

Zones 2, 3 and 4 are identical to zones 2, 3 and 4 of the embodiment illustrated in FIG. 1. Only zone 1, which involves the prepolymerization zone is different.

The prepolymerization takes place in a reactor (14) in the form of a vertical column, in which liquid alkane(s) and prepolymer/catalyst suspension move upwards in the manner of a piston, i.e. without appreciable back mixing between the superposed layers.

The reactor (14) comprises an elongate vertical cylinder for which the ratio of the height to the diameter can be equal to at least about 5, e.g. 5 to 40, preferably 10 to 30. This cylinder can be divided into superposed compartments by horizontal partitions (15) having a central opening through which the liquid alkane(s) and the suspension passe from bottom to top.

The reactor (14) is equipped with a mechanical stirrer comprising a vertical shaft (16) rotated by a motor (17). The shaft (16) carries mixing blades (18).

Advantageously, said shaft can also carry horizontal discs (19) whose external diameter is approximately equal to or slightly greater than the diameter of the central opening in the partitions (15).

A disc (19) is arranged slightly above and below each partition. The discs and the partitions form baffles between which the liquid alkane(s) and the prepolymer/catalyst suspension passe.

The gap between a partition and its associated disc makes it possible to regulate the speed of circulation of the prepolymer suspension being formed and its residence time in each compartment.

At its base, the reactor (14) has an inlet (20) for a continuous flow of the liquid alkane(s), which may or may not be preheated.

Said reactor has a feed pipe (21) through which one or more olefinic monomers arrive continuously. The pipe (21) has several inlets, (211), (212), ... (21n), distributed over the height of the reactor (14). If appropriate, hydrogen can also be injected into the reactor (14) through a pipe (21a). At its base, the reactor (14) has a continuous inlet (22) for catalyst and optionally a continuous inlet (23) for a cocatalyst or a catalyst activator. At its top, it has an outlet (24) through which a suspension of prepolymer particles in the liquid alkane(s), which has been formed in the reactor (14), flows continuously. At its base, it can have an outlet (25) through which the coarsest prepolymer particles can be removed if necessary.

The reactor (14) has cooling means which make it possible to keep the temperature T1 of the prepolymerization in the bottom of the reactor (14) at a relatively low value so that the initial polymerization rate is low, and which make it possible to obtain an increasing temperature along the whole of the reactor up to a temperature T2 in the top of the reactor (14).

According to a preferred embodiment illustrated in FIG. 2, the reactor (14) has a jacket divided into at least two separate stages, and cooling liquid, generally water, is circulated separately in each the stages delimited by these jackets so as to remove heat and keep the temperature of the prepolymerization in the bottom of the reactor at a value T1 such as described above, and the temperature of the prepolymerization in the top of the reactor at a value T2 such as described above.

The difference of the temperatures T1 and T2 such as described above and the increasing concentration of the olefinic monomer(s) in the liquid alkane(s) passing upwards in the reactor (14) are such that the polymerization rate in the top of the reactor is 2 to 20, preferably 5 to 10 times the prepolymerization rate in the bottom of the reactor.

As a variant, the catalyst and/or the cocatalyst or the catalyst activator can also be introduced into the reactor (14) at several levels so that the prepolymerization rate increases from the bottom to the top of the reactor (14).

According to a variant, the flow rate of the liquid alkane(s) introduced continuously into the reactor (14) may be regulated so that the ascending velocity in the reactor is less than the sedimentation velocity of the prepolymer particles with a diameter greater than a threshold value, for example greater than 300 or 500 microns with the result that the coarsest particles with a diameter greater than this threshold value are deposited and are removed in counter-current from the bottom of the reactor (14) through the outlet (25). Alternatively the separation of the coarsest prepolymer particles may be performed in the same way in a corresponding particle separation apparatus (11) in the post-treatment zone.

The invention is illustrated in the following Examples.

EXAMPLE 1

An Example of the production of an ethylene/butene-1 copolymer in a gas phase with the aid of a prepolymer prepared in a prepolymerization unit according to FIG. 2, comprising especially a prepolymerization reactor (14), is described below. The reactor (14) was a cylindrical column with a diameter of 0.5 m and a height of 8 m. It was cooled externally by a jacket divided into two superposed stages. The pressure in the reactor was $3 \times 10^5$ Pa. The reactor was divided into five stages separated by horizontal partitions (15). Each stage had stirring blades (18) mounted on a common drive shaft (16), which was driven at a speed of 100 rpm.

The shaft (16) also carried discs (19) placed above each partition (15) and the distance between each disc and a partition was chosen so that the velocity of the suspension in the passage delimited by a partition and a disc was of 1.2 cm/s.

The reactor (14) was fed through the inlet (20), situated at the base, with a continuous stream of n-hexane, at a rate of 320 l/h.

The inlet (22) of the reactor received, at a rate of 50 l/h, a suspension in n-hexane of particles of a catalyst based on titanium and magnesium, prepared according to Example 1 of French Patent Application FR-A-2405961. The flow rate and the concentration of the prepolymer was such that the flow rate of catalyst was equal to 4.5 mol of titanium per hour. The temperature of the suspension was kept at 30° C. in the lower stage and at 70° C. in the upper stage.

Ethylene arrived through the line (21) at a rate of 150 kg/h, mixed with hydrogen flowing at a rate of 0.4 kg/h.

The mixture of ethylene and hydrogen was introduced into all the five stages of the reactor. The distribution of the flow among the five stages was controlled by conventional means.

A solution of tri-n-octylaluminium in n-hexane, with a concentration of 1 mol/l, was injected into the reactor through the inlet (23) at a rate corresponding to 5 mol/h.

The prepolymer suspension emerged from the reactor through the outlet (24) with a concentration of 225 kg of prepolymer per cubic meter and under a pressure P of $3 \times 10^5$ Pa. The suspension was sent continuously at 70° C. into a degassing vessel (10), which had a volume of 2 m$^3$ and in which the pressure was equal to $2 \times 10^5$ Pa, so that the ethylene dissolved in the n-hexane degassed and was removed continuously through the pipe (10a).

The suspension emerging from the degassing vessel (10) through the pipe (13) entered a separator (11). The separator was a cylindrical column with an internal diameter of 0.5 m and a height of 5 m. At the top, it was equipped with an outlet pipe (13a) and a hemispherical dome. The base of the column consisted of a truncated cone with a circular opening of 0.15 m diameter, which communicated directly with a concentration vessel (11a) equipped with a mechanical stirrer. The prepolymer suspension with a concentration of 225 kg/m$^3$ arrived in the separator (11) through the pipe (13) at a rate of 250 l/h.

The pipe (13) penetrated inside the cylindrical column of the separator (11) and opened out on its central axis with an opening facing towards the top, at a level which was 1 m for the base of this column. A suspension of 100 l/h of n-hexane containing 7 kg of fine prepolymer particles emerged continuously through the outlet pipe (13a). This suspension was recycled to the base of the prepolymerization reactor (14) via the inlet (20). At the base of the separator (11), a suspension of prepolymer in n-hexane, with a concentration of about 300 kg/m$^3$, was collected at a rate of about 150 l/h in the stirred concentration vessel (11a).

The prepolymer suspension which had been concentrated in this way, and from which the fine particles had been removed, was continuously injected directly into a fluidized bed polymerization reactor (5) at a rate of 150 l/h.

The fluidized bed polymerization reactor essentially comprised a vertical cylinder of 4.5 m diameter, equipped at its base with a fluidization grid and containing a bed of 60 tonnes of a powder of an ethylene/but-1-ene copolymer with a density of 0.95 g/cm$^3$, said powder consisting of particles with an average diameter of 800 microns. A gaseous mixture containing (% by volume) 30% of ethylene, 20% of hydrogen, 2% of but-1-ene, 23% of nitrogen and 5% of n-hexane, under a pressure of 2.2 MPa and at a temperature of 92° C., passed through the bed in an ascending stream with a velocity of 0.5 m/s. The gaseous mixture emerged through the top of the reactor and was recycled by a compressor to the base of the reactor (5), underneath the fluidization grid, after having been cooled to a temperature which enabled the polymerization temperature in the fluidized bed to be kept constant at 92° C.

Under these conditions, an ethylene/but-1-ene copolymer with a density of 0.95 g/cm$^3$ and a melt flow index of 7 g/10 minutes, measured at 190° C. under a weight of 2.16 kg according to the method ASTM-D-1238 condition E, was produced at a rate of 14 tonnes per hour.

EXAMPLE 2

An Example of the production of an ethylene/but-1-ene copolymer in the gas phase, with the aid of a prepolymer prepared in a prepolymerization unit according to FIG. 1, was described below.

A first vessel (6) comprised a cylinder with an internal diameter of 0.85 m, a height of 1.9 m and a volume of 1 m$^3$.

n-Hexane was introduced into the vessel (6) through a pipe (8) at a rate of 0.56 m$^3$/h and a mixture of ethylene and hydrogen was introduced through a pipe (8a) at a rate corresponding to 20 kg/h of ethylene and 20 g/h of hydrogen.

A suspension of a catalyst identical to that used in Example 1, containing 200 mol of titanium per m$^3$, was introduced through a pipe (8b) at a rate of 0.0188 m$^3$/h and a solution of tri-n-octylaluminium in n-hexane, with a concentration of 1 mol/l, was introduced through a pipe (8c) at a rate of 4 mol/h.

The pressure in the vessel (6) was kept at a constant value of $3 \times 10^5$ Pa.

The ethylene partial pressure in the vessel (6) was $2.5 \times 10^5$ Pa. The temperature was kept constant at a value of 50° C. circulation of water in a jacket. The average residence time of the prepolymer produced in the vessel (6) was of one hour about.

A second vessel (7) comprised a cylinder with an internal diameter of 1.3 m, a height of 2.9 m and a volume of 3.5 m$^3$.

The vessel (7) received 130 kg/h of ethylene and about 13 g/h of hydrogen through a pipe (8a), so that the ethylene partial pressure in the vessel (7) was equal to $2.5 \times 10^5$ Pa. The temperature in the vessel (7) was kept constant at a value of 70° C. The suspension emerging from the vessel (6) through the pipe (8d) was introduced continuously into the vessel (7), where the average residence time of the prepolymer was of three hours about.

A continuous flow of 0.75 m³/h of a suspension containing 200 kg/m³ of a prepolymer under a pressure of $2.5 \times 10^5$ Pa was obtained at the outlet of the vessel (7).

This suspension was sent continuously at 70° C. into a degassing vessel (10) identical to that described in Example 1, in which a pressure of $2 \times 10^5$ Pa prevailed and from which gaseous ethylene which had been dissolved in the n-hexane, escaped at a rate of about 5 kg/h.

The suspension emerging from the degassing vessel (10) through the pipe (13) entered a separator (11) identical to that described in Example 1. At the top of the separator, a suspension of fine prepolymer particles with a concentration of 40 kg/m³ emerged through a pipe (13a) at a continuous rate equal to 0.25 m³/h. This suspension was recycled into the vessel (6). At the base of the separator (11), a prepolymer suspension with a concentration of 300 kg/m³ was collected in the concentration vessel (11a) at a rate of 150 l/h and injected continuously into a fluidized bed polymerization reactor (5) identical to that described in Example 1.

Under conditions of copolymerization of ethylene and but-1-ene in a gas phase which were identical to those of Example 1, an ethylene/but-1-ene copolymer with a density of 0.95 g/cm³ and a melt flow index of 7 g/10 minutes, measured at 190° C. under a weight of 2.16 kg, according to the method ASTM-D-1238 condition E, was produced at a rate of 14 tonnes per hour.

We claim:

1. A process for polymerization of one or more olefinic monomers in a gas phase polymerization reactor in the presence of a solid catalyst comprising a transition metal belonging to group IV, V or VI of the Periodic Table of the Elements, said process being one in which the solid catalyst is introduced into the reactor in the form of a prepolymer suspension prepared in a prepolymerization zone by bringing at least one of the olefinic monomers into contact with the said solid catalyst in the presence of one or more liquid saturated hydrocarbons to form a suspension of prepolymer particles in the said liquid saturated hydrocarbon(s) containing olefinic monomer(s) under a pressure P, characterized in that a suspension of prepolymer particles in the liquid saturated hydrocarbon(s) flows continuously from the prepolymerization zone via a post-treatment zone to the gas phase polymerization reactor, the suspension being subjected in the post-treatment zone to an operation comprising degassing for removing unreacted olefinic monomer(s) from the said suspension.

2. A process according to claim 1, characterized in that the said suspension is subjected in the post-treatment zone to a concentration operation comprising concentrating the said suspension by removing part of the said liquid saturated hydrocarbon(s) from prepolymer particles.

3. A process according to claim 2, characterized in that the degassing and concentration operations are performed simultaneously or, preferably, successively in the direction of the continuous flow.

4. A process according to claim 1, claim 2 or claim 3, characterized in that a suspension of prepolymer particles is subjected to a particles separation operation comprising separating the finest and/or coarsest prepolymer particles from said suspension in the prepolymerization zone and/or the post-treatment zone.

5. A process according to claim 4, characterized in that the degassing and particle separation operations are performed simultaneously or, preferably, successively in the direction of the continuous flow.

6. A process according to claim 4, characterized in that the particle separation and concentration operations are performed simultaneously or, preferably, successively in the direction of the continuous flow.

7. A process according to claim 6, characterized in that the suspension of prepolymer particles is subjected in the post-treatment zone to the degassing operation followed simultaneously or, preferably, successively in the direction of the continuous flow by the particle separation and concentration operations.

8. A process according to claim 1, claim 2 or claim 3, characterized in that a catalyst activator or a cocatalyst and/or a catalyst inhibitor are/is added in variable amounts to the suspension of prepolymer particles flowing through the post-treatment zone, or preferably flowing from the post-treatment zone to the gas phase polymerization reactor, in order to control the polymerization rate in the said reactor.

9. A process according to claim 1, claim 2 or claim 3, characterized in that the unreacted olefinic monomer(s) removed in the degassing operation is/are recycled into the prepolymerization zone and/or the gas phase polymerization reactor.

10. A process according to claim 1, claim 2 or claim 3, characterized in that the finest prepolymer particles separated from prepolymer suspension in the particle separation operation are recycled into the prepolymerization zone.

11. A process according to claim 2 or claim 3, characterized in that the liquid saturated hydrocarbon(s) removed from prepolymer suspension in the concentration operation is/are recycled into the prepolymerization zone.

12. A process according to claim 4, characterized in that during the formation of the suspension of prepolymer particles in the prepolymerization zone, the suspension is subjected to a particle separation operation comprising separating the coarsest prepolymer particles from said suspension.

13. A process according to claim 1, claim 2 or claim 3, characterized in that the prepolymerization is carried out in the presence of a catalyst activator or a cocatalyst selected amongst the organometallic compounds containing a metal of group I, II or III of the Periodic Table of elements.

14. A process according to claim 1, claim 2 or claim 3, characterized in that the solid catalyst used in the prepolymerization is selected amongst Ziegler-Type catalysts containing atoms of magnesium, halogen together with titanium and/or vanadium and/or zirconium.

15. A process according to claim 1, claim 2 or claim 3, characterized in that the solid catalyst used in the prepolymerization is selected amongst catalysts containing thermally activated chromium oxide supported on a refractory oxide.

16. A process according to claim 1, claim 2 or claim 3, characterized in that in the degassing operation the pressure over the suspension of prepolymer particles is reduced by 5 to 80% of the pressure P.

17. A process according to claim 1, claim 2 or claim 3, characterized in that the liquid saturated hydrocarbon(s) is/are selected amongst alkanes containing 4 to 10 carbon atoms and amongst cycloalkanes containing 5 to 8 carbon atoms.

18. A process according to claim 6, characterized in that the prepolymerization is carried out in the presence of (a) a solid catalyst comprising a transition metal belonging to group IV, V or VI of the Periodic Table of the elements, (b) an organometallic compound containing a metal of group I, II or III of the Periodic Table of the elements and (c) one or more liquid alkane(s) containing 4 to 8 carbon atoms.

* * * * *